(12) United States Patent
Matsushima et al.

(10) Patent No.: US 9,689,355 B2
(45) Date of Patent: Jun. 27, 2017

(54) VEHICLE BODY FRAME STRUCTURE OF SADDLE-RIDE TYPE VEHICLE

(71) Applicants: HONDA MOTOR CO., LTD., Tokyo (JP); TORAY INDUSTRIES, INC., Tokyo (JP)

(72) Inventors: Satoshi Matsushima, Wako (JP); Yasuhiro Nakayama, Wako (JP); Hiroki Wakabayashi, Nagoya (JP)

(73) Assignees: HONDA MOTOR CO., LTD., Tokyo (JP); TORAY INDUSTRIES, INC., Tokyo (JP)

( * ) Notice: Subject to any disclaimer, the term of this patent is extended or adjusted under 35 U.S.C. 154(b) by 312 days.

(21) Appl. No.: 14/475,136

(22) Filed: Sep. 2, 2014

(65) Prior Publication Data

US 2015/0060177 A1    Mar. 5, 2015

(30) Foreign Application Priority Data

Sep. 5, 2013    (JP) ................................. 2013-184288

(51) Int. Cl.
| | |
|---|---|
| *B62K 11/04* | (2006.01) |
| *B62K 19/16* | (2006.01) |
| *F02M 35/02* | (2006.01) |
| *F02M 35/16* | (2006.01) |

(52) U.S. Cl.
CPC ......... *F02M 35/0201* (2013.01); *B62K 11/04* (2013.01); *B62K 19/16* (2013.01); *F02M 35/162* (2013.01)

(58) Field of Classification Search
CPC ........ B62K 11/02; B62K 11/04; B62K 19/16; B62K 2700/04; B62K 2700/10; B62K 2700/16; B22D 21/04

USPC ........................................ 180/219; 297/195.1
See application file for complete search history.

(56) References Cited

U.S. PATENT DOCUMENTS

| 7,497,455 | B2 * | 3/2009 | Kamalian | ............. | B62K 11/04 |
|---|---|---|---|---|---|
| | | | | | 280/274 |
| 8,814,244 | B2 * | 8/2014 | Yokouchi | ............... | B62K 19/46 |
| | | | | | 296/37.15 |
| 9,291,130 | B2 * | 3/2016 | Matsushima | ........ | F02M 35/162 |
| 9,422,024 | B2 * | 8/2016 | Al-Sheyyab | ........... | B62K 19/16 |
| 2006/0021814 | A1 * | 2/2006 | Hasegawa | ................ | B62J 17/02 |
| | | | | | 180/219 |

(Continued)

FOREIGN PATENT DOCUMENTS

| JP | 58-049581 A | 3/1983 |
|---|---|---|
| JP | 07-215256 A | 8/1995 |

(Continued)

*Primary Examiner* — Anne Marie Boehler
(74) *Attorney, Agent, or Firm* — Birch, Stewart, Kolasch & Birch, LLP

(57) ABSTRACT

A vehicle body frame structure of a saddle-ride type vehicle includes: a frame body having at least a part made of fiber reinforced resin and forming at least part of a vehicle body frame supporting a rider seat and a power unit which generates drive force for driving a drive wheel. The structure increases freedom in partially setting thickness of the frame body. The frame body is formed by joining together a press-molded outer body made of fiber reinforced resin and an injection-molded inner body made of resin with the inner body brought into contact with an inner surface of the outer body.

8 Claims, 5 Drawing Sheets

(56) References Cited

U.S. PATENT DOCUMENTS

| | | | | |
|---|---|---|---|---|
| 2009/0242313 A1* | 10/2009 | Morita | ............... | B62K 19/12 180/312 |
| 2013/0278025 A1* | 10/2013 | Wakabayashi | ......... | B62K 19/16 297/195.1 |
| 2016/0200387 A1* | 7/2016 | Matsushima | .......... | B62K 11/04 180/219 |

FOREIGN PATENT DOCUMENTS

| | | | | |
|---|---|---|---|---|
| JP | 2005-271849 A | 10/2005 | | |
| JP | 3158965 U | 3/2010 | | |
| JP | 2011-148452 A | 8/2011 | | |
| WO | 2013/019727 | * 2/2013 | ............. | B62K 11/04 |

* cited by examiner

VEHICLE BODY FRAME STRUCTURE OF SADDLE-RIDE TYPE VEHICLE

CROSS REFERENCES TO RELATED APPLICATIONS

The present application claims priority under 35 U.S.C. §119 to Japanese Patent Application No. 2013-184288 filed Sep. 5, 2013 the entire contents of which are hereby incorporated by reference.

BACKGROUND OF THE INVENTION

Field of the Invention

The present invention relates to a vehicle body frame structure of a saddle-ride type vehicle comprising: a frame body having at least a part made of fiber reinforced resin and forming at least part of a vehicle body frame supporting a rider seat and a power unit which generates drive force for driving a drive wheel.

Description of the Related Art

The following technique of manufacturing a rear frame of a two-wheeled motor vehicle is known from Japanese Patent Application Laid-open No. 7-215256. A sheet material made of fiber reinforced resin is subjected to shallow drawing with a press while being heated to thereby form an outer body and an inner body. Then, flanges of the outer body and the inner body are welded together by high frequency welding.

SUMMARY OF THE INVENTION

However, in the technique disclosed in Japanese Patent Application Laid-open No. 7-215256, since the outer body and the inner body are both formed by press-molding, it is difficult to partially change thickness of the bodies to partially increase strength of the bodies.

The present invention has been made in view of the situation described above and an object thereof is to provide a vehicle body frame structure of a saddle-ride type vehicle which can increase freedom in partially setting thickness of a frame body having at least a part made of fiber reinforced resin.

In order to achieve the object, according to a first aspect of the present invention, there is provided a vehicle body frame structure of a saddle-ride type vehicle comprising: a frame body having at least a part made of fiber reinforced resin and forming at least part of a vehicle body frame supporting a rider seat and a power unit which generates drive force for driving a drive wheel, wherein the frame body is formed by joining together a press-molded outer body made of fiber reinforced resin and an injection-molded inner body made of resin with the inner body brought into contact with an inner surface of the outer body.

According to the first aspect of the present invention, since the inner body which is made of resin and which forms the frame body together with the press-molded outer body made of fiber reinforced resin is formed by injection molding, freedom in partially setting thickness of the inner body is increased. Hence, thickness of a portion whose strength is desired to be secured can be increased to increase strength of this portion and the outer body can be reinforced by bringing the inner body into contact with the outer body. Moreover, since thickness of the outer body can be uniform, it is possible to greatly reduce the number of preform steps and reduce manufacturing cost.

According to a second aspect of the present invention, in addition to the first aspect, the frame body is a rear frame which supports the rider seat and which is fastened to a fastened portion of a front frame supporting the power unit and extends rearward from the front frame to form the vehicle body frame in cooperation with the front frame, and an outer fastening portion formed integrally in a front end portion of the outer body and an inner fastening portion formed integrally in a front end portion of the inner body are jointly fastened to the fastened portion.

According to the second aspect of the present invention, since the outer fastening portion in the front end portion of the outer body and the inner fastening portion in the front end portion of the inner body are jointly fastened to the fastened portion of the front frame, stiffness of a connection portion of the rear frame to the front frame can be secured with the outer fastening portion reinforced by the inner fastening portion.

According to a third aspect of the present invention, in addition to the second aspect, the inner fastening portion is formed to be thicker than a portion of the inner body other than the inner fastening portion.

According to the third aspect of the present invention, partially increasing thickness of the inner fastening portion can increase the strength only in a portion requiring higher strength with an increase in the weight of the entire rear frame avoided.

According to a fourth aspect of the present invention, in addition to the second or third aspect, a flat plate-shaped side wall portion connecting a pair of upper and lower outer fastening portions, as said outer fastening portion, is formed integrally in the outer body, the pair of the outer fastening portions arranged to be spaced away from each other in an up-down direction.

According to the fourth aspect of the present invention, connecting the pair of upper and lower outer fastening portions by the side wall portion can increase strength of the connection portion of the press-molded outer body to the front frame in a simple configuration.

According to a fifth aspect of the present invention, in addition to the second or third aspect, the outer body integrally includes a pair of left and right side wall portions and an upper wall portion connecting upper ends of the side wall portions to each other and is thus formed to have a U-shaped cross section opened downward, and the inner body integrally includes a lower wall portion facing the upper wall portion from below and is formed in contact with inner surfaces of the pair of left and right side wall portions to form the rear frame in a box shape together with the outer body.

According to the fifth aspect of the present invention, since the outer body is formed to have the U-shaped cross section opened downward and the inner body including the lower wall portion facing the upper wall portion of the outer body from below forms the box-shaped rear frame together with the outer body, a portion of the rear frame exposed on a lateral side of the vehicle is smooth and ride quality of a rider sitting on the rider seat can be improved. Moreover, load of the rider seat and the rider sitting on the rider seat is received by the upper wall portion of the outer body and good distribution of the load can be thus achieved.

According to a sixth aspect of the present invention, in addition to the fifth aspect, an intake port opened in at least one of the side wall portions and the upper wall portion is provided in the outer body, a rib having an endless shape surrounding the intake port and protruding inward or outward is provided integrally in the outer body, and an unpurified air chamber of an air cleaner is formed by the rear frame to communicate with the intake port.

According to the sixth aspect of the present invention, the intake port is provided in at least one of the side wall portions and the upper wall portion. Accordingly, outside air can be taken into the unpurified air chamber of the air cleaner from the intake port communicating with the unpurified air chamber with a peripheral edge of the intake port reinforced by the rib. In addition, the rib in the peripheral edge of the intake port can achieve a structure which straightens intake air and hinders discharging of the intake air. Hence, intake efficiency can be improved.

According to a seventh aspect of the present invention, in addition to the sixth aspect, in a front portion of the inner body, connection arm portions each having the inner fastening portion in a tip end portion thereof are integrally formed to be spaced away from each other in an up-down direction in each of left and right sides of the inner body, and a cross portion connecting base portions of the connection arm portions together is integrally formed, and a cleaner element of the air cleaner is supported by the cross portion.

According to the seventh aspect of the present invention, the base portions of the connection arm portions spaced away from one another in the up-down direction in each of the left and right sides in the front portion of the inner body are connected together by the cross portion and the cleaner element is supported by the cross portion. Accordingly, it is possible to secure strength of the rear frame and also reduce the weight of the rear frame because there is no need to attach a special member for supporting the cleaner element to the rear frame.

According to an eighth aspect of the present invention, in addition to any one of the first to third aspects, the outer body is made of carbon fiber and thermosetting resin.

According to the eighth aspect of the present invention, since the outer body is made of carbon fiber and thermosetting resin which has better surface quality and better designability than thermoplastic resin, the outer body can have excellent surface quality and excellent designability and particularly be formed in a complex shape by press-molding. Moreover, press preprocessing such as preheating and the like is unnecessary and cost of manufacturing facility can be reduced. Furthermore, since viscosity of the resin in a melted state is low, it is possible to employ low-pressure pressing and further reduce the cost of manufacturing facility.

According to a ninth aspect of the present invention, in addition to any one of the first to third aspects, reinforcing fiber used in the outer body is formed as continuous fiber.

According to the ninth aspect of the present invention, the reinforcing fiber used in the outer body is formed as continuous fiber and this can increase strength and stiffness of the outer body.

The above and other objects, characteristics and advantages of the present invention will be clear from detailed descriptions of the preferred embodiments which will be provided below while referring to the attached drawings.

DESCRIPTION OF THE PREFERRED EMBODIMENTS

Embodiments of the present invention are described below with reference to the attached drawings. In the following description, front, rear, left, right, up, and down refer to directions as viewed from a rider riding on a two-wheeled motor vehicle.

Figure 1:
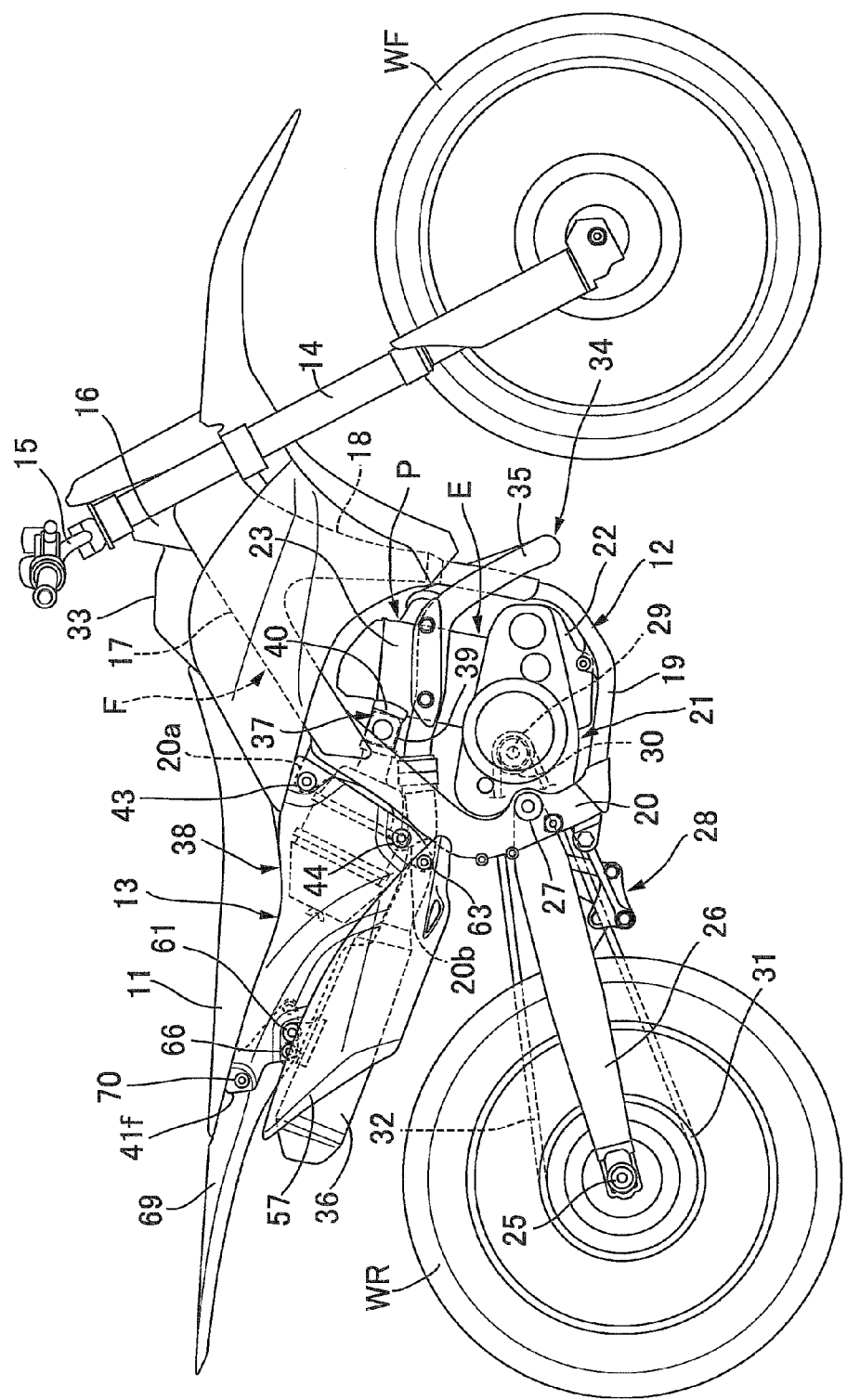
FIG. 1 is a side view of a main portion of a two-wheeled motor vehicle in a first embodiment.

A first embodiment of the present invention is described with reference to FIGS. 1 to 4. First, a saddle-ride type vehicle shown in FIG. 1 is a two-wheeled motor vehicle for motocross competition and a rider seat 11 and a power unit P are supported on a vehicle body frame F of the two-wheeled motor vehicle, the power unit P generating drive force for driving a rear wheel WR which is a drive wheel. At least part of the vehicle body frame F is formed of a frame body made of fiber reinforced resin. In the embodiment, the vehicle body frame F includes a front frame 12 which supports the power unit P and a rear frame 13 which is the frame body. The rear frame 13 is fastened to the front frame 12 and extends rearward from the front frame 12, and the rider seat 11 is supported by the rear frame 13.

The front frame 12 includes: a head pipe 16 by which a bar-shaped steering handle 15 and a front fork 14 pivotally supporting a front wheel WF are steerably supported; a pair of left and right main frames 17 which extend downward toward a rear side from the head pipe 16; a down frame 18 which extends downward toward the rear side from the head pipe 16 at a steeper angle than the main frames 17; a pair of left and right lower frames 19 which are provided continuously with a lower end portion of the down frame 18 and which extend rearward; and a pair of left and right pivot frames 20 whose upper end portions are joined to rear end portions of the main frames 17 and extend downward and whose lower end portions are provided continuously with rear end portions of the lower frames 19.

The power unit P including an engine E is supported on the front frame 12, and an engine main body 21 of the engine E is mounted on the front frame 12 to be disposed in an area surrounded by the main frames 17, the down frame 18, the lower frames 19, and the pivot frames 20 in a side view.

An axle 25 of the rear wheel WR is pivotally supported by a rear end portion of a swing arm 26 extending in a front-rear direction, and a front end portion of the swing arm 26 is supported for up-and-down swinging movement by the lower end portions of the pivot frames 20 via a supporting shaft 27. Moreover, a link mechanism 28 is provided between lower portions of the pivot frames 20 and the swing arm 26.

A transmission (not illustrated) forming the power unit P together with the engine E is housed in a crankcase 22 forming part of the engine main body 21, and an output shaft 29 of the transmission protrudes leftward from the crankcase 22. An endless chain 32 is wound around a drive sprocket 30 provided in the output shaft 29 and a driven sprocket 31 provided in the axle 25 of the rear wheel WR.

A fuel tank 33 is provided on both the main frames 17, above the engine main body 21. The rider seat 11 is disposed behind the fuel tank 33 to be supported by the rear frame 13.

An exhaust system 34 connected to a cylinder head 23 forming part of the engine main body 21 includes: a pair of left and right exhaust pipes 35 connected to a front wall surface of the cylinder head 23 and extending to lateral sides and then to a rear side of the engine main body 21; and a pair of left and right exhaust mufflers 36 disposed on opposite sides of the rear wheel WR in a vehicle width direction and connected separately to the exhaust pipes 35.

An intake system 37 connected to a rear portion side wall of the cylinder head 23 includes: an air cleaner 38 which is partially formed of the rear frame 13; a throttle body 39 whose upstream end is connected to the air cleaner 38; and an intake pipe 40 which connects the throttle body 39 and the cylinder head 23 to each other.

Figure 2:
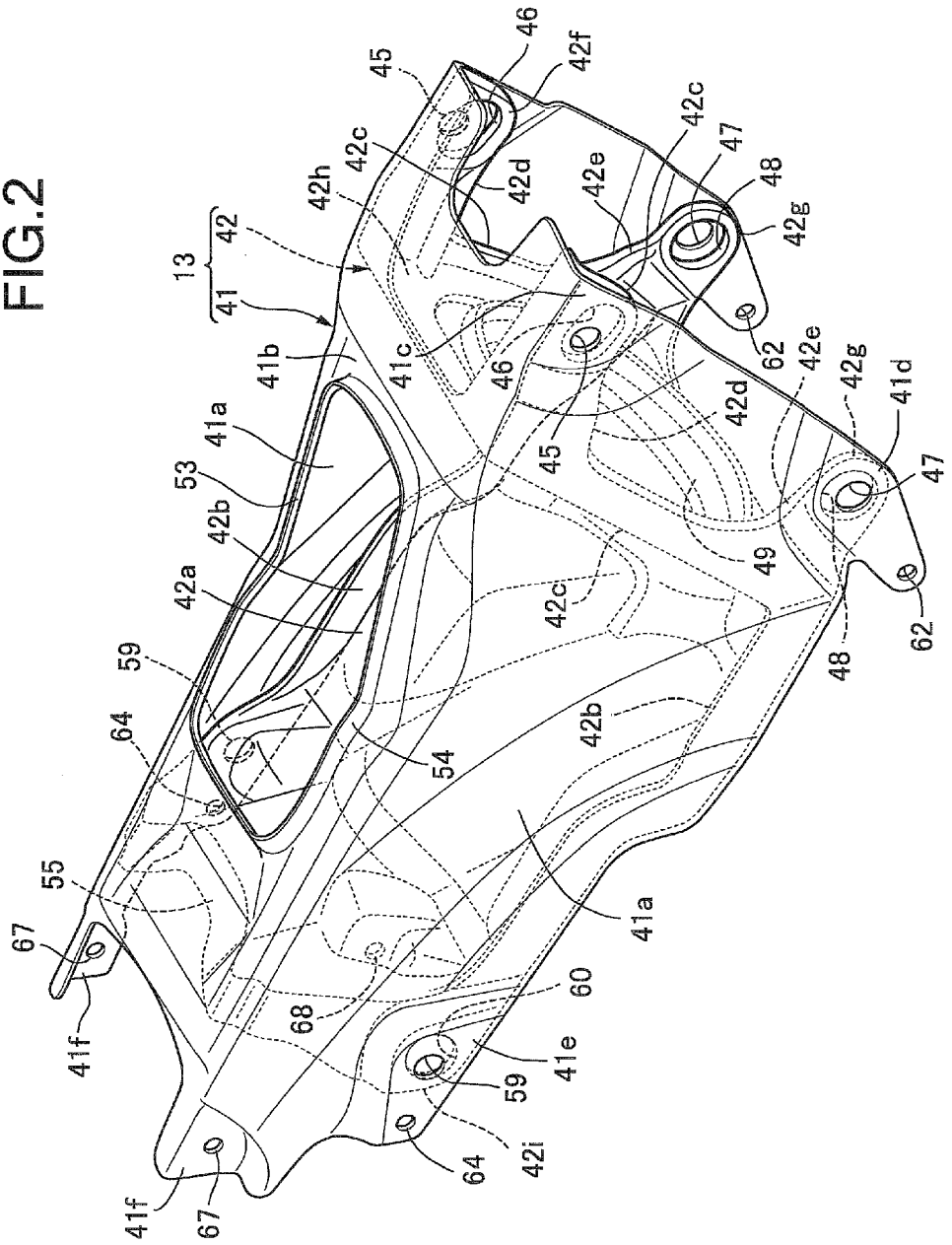
FIG. 2 is a perspective view of a rear frame.
Figure 3:
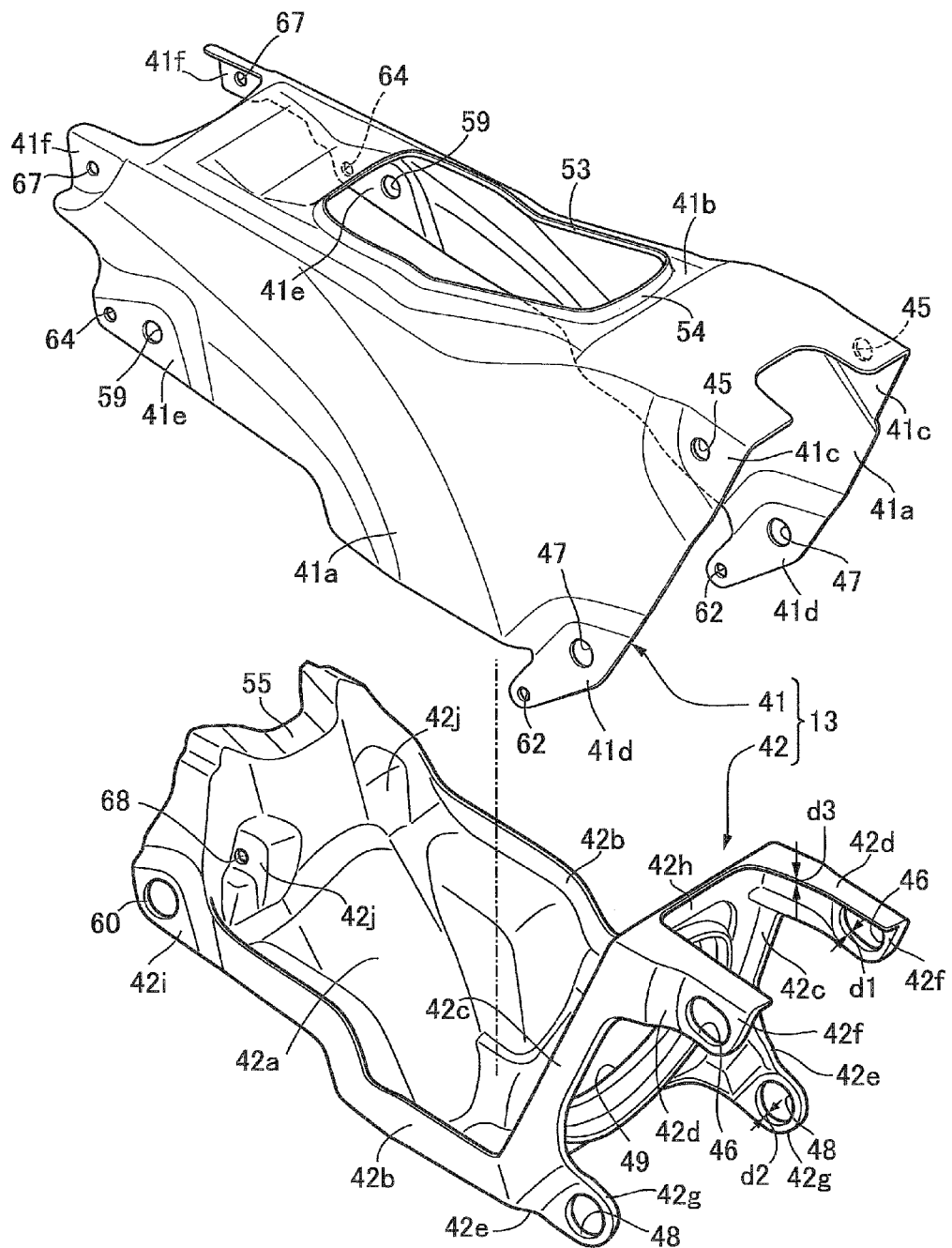
FIG. 3 is an exploded perspective view of the rear frame.
Figure 4:
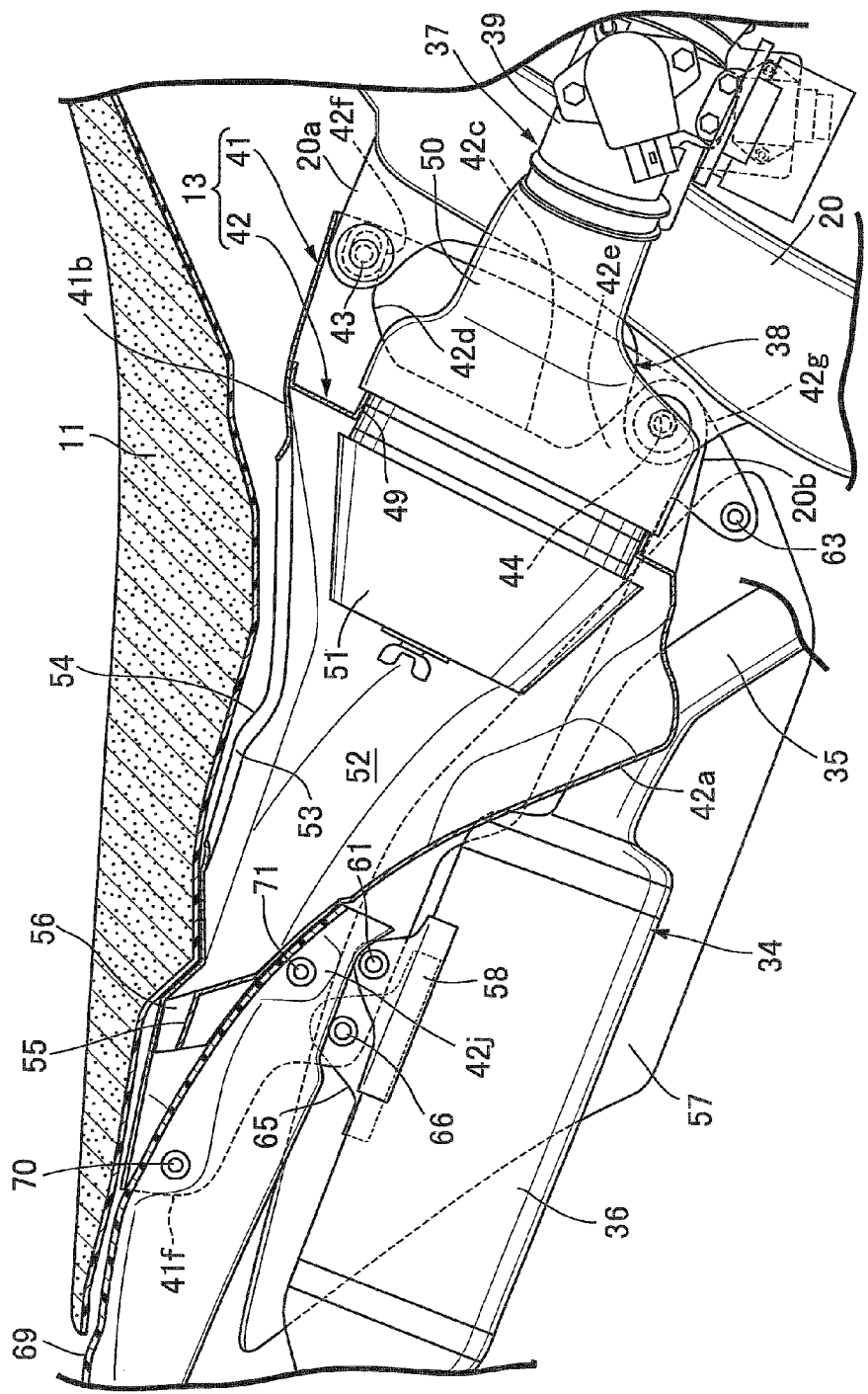
FIG. 4 is a longitudinal cross-sectional view of a rider seat and the rear frame.

Referring also to FIGS. 2 to 4, the rear frame 13 is formed by joining an outer body 41 and an inner body 42 to each other through adhesion or rivet coupling with the inner body 42 brought into contact with an inner surface of the outer body 41, the outer body 41 made of fiber reinforced resin and formed by press-molding while being heated, the inner body 42 made of resin and formed by injection-molding.

The outer body 41 made of fiber reinforced resin is made of thermosetting resin such as epoxy resin and the like and carbon fiber which is formed as continuous fiber. Moreover, in the embodiment, the inner body 42 made of resin is made of thermoplastic resin in which short fiber made of carbon are mixed. However, the inner body 42 may be made of resin in which no carbon is mixed or resin in which fine reinforcement material other than carbon is mixed.

The outer body 41 integrally includes a pair of left and right side wall portions 41a having flat plate shapes and an upper wall portion 41b connecting upper ends of the side wall portions 41a and is thus formed to have a U-shaped cross section opened downward.

Meanwhile, to form the box-shaped rear frame 13 together with the outer body 41, the inner body 42 integrally includes: a lower wall portion 42a facing the upper wall portion 41b from below; a pair of left and right lower frame portions 42b standing upright from left and right ends of the lower wall portion 42a to be in contact with inner surfaces of lower portions of the side wall portions 41a of the outer body 41; and a pair of left and right vertical frame portions 42c standing upright from front ends of the lower frame portions 42b to be in contact with inner surfaces of the side wall portions 41a of the outer body 41. The lower wall portion 42a is formed such that the distance between the lower wall portion 42a and the upper wall portion 41b becomes smaller toward the rear side in the vehicle front-rear direction.

A first connection arm portion 42d extending forward from an upper end portion of each of the vertical frame portions 42c and a second connection arm portion 42e extending forward from a lower end portion of each of the vertical frame portions 42c are formed integrally in a front portion of the inner body 42. Specifically, the first connection arm portion 42d and the second connection arm portion 42e are formed integrally in the front portion of the inner body 42 on each of left and right sides of the inner body 42 while being spaced away from each other in an up-down direction. Each of the first connection arm portion 42d is formed to have a substantially L-shaped cross section to be in contact with the inner surface of a corresponding one of the side wall portions 41a and the upper wall portion 41b of the outer body 41. Each of the second connection arm portion 42e is formed in contact with the inner surface of a corresponding one of the side wall portions 41a of the outer body 41.

A first fastened portion 20a protruding toward the rear frame 13 is provided integrally in an upper portion of each of the pivot frames 20 in the front frame 12 and a second fastened portion 20b protruding toward the rear frame 13 is provided integrally in an intermediate portion of each of the pivot frames 20 in an up-down direction.

First outer fastening portions 41c formed in an upper portion of a front portion of the outer body 41 and first inner fastening portions 42f formed in an upper portion of a front portion of the inner body 42 are jointly fastened to the first fastened portions 20a by using first bolts 43. Second outer fastening portions 41d formed in a lower portion of the front portion of the outer body 41 and second inner fastening portions 42g formed in a lower portion of the front portion of the inner body 42 are jointly fastened to the second fastened portions 20b by using second bolts 44.

A circular insertion hole 45 is formed in each of the first outer fastening portions 41c, an insertion hole 46 having a long hole shape elongating in the front-rear direction is provided in each of the first inner fastening portions 42f to correspond to the insertion hole 45, and the first bolt 43 is inserted into the insertion holes 45, 46. A circular insertion hole 47 is formed in each of the second outer fastening portions 41d, a circular insertion hole 48 having a larger diameter than the insertion hole 47 of the second outer fastening portion 41d is provided in each of the second inner fastening portions 42g to correspond to the insertion hole 47, and the second bolt 44 is inserted into the insertion holes 47, 48.

The first inner fastening portions 42f are formed integrally at front ends of the first connection arm portions 42d and the second inner fastening portions 42g are formed integrally at front ends of the second connection arm portions 42e. Moreover, thickness d1 of each first inner fastening portion 42f and thickness d2 of each second inner fastening portion 42g are set to be greater than thickness d3 of a portion of the inner body 42 other than the first and second inner fastening portions 42f, 42g, and the first and second inner fastening portions 42f, 42g are thus formed to be thicker than the portion of the inner body 42 other than the first and second inner fastening portions 42f, 42g.

Furthermore, each of the side wall portions 41a of the outer body 41 is formed to connect a corresponding pair of the upper first outer fastening portion 41c and the lower second outer fastening portion 41d which are arranged to be spaced away from each other in the up-down direction.

A flat plate-shaped cross portion 42h connecting base portions of the first and second connection arm portions 42d, 42e to one another is formed integrally in the front portion of the inner body 42, the first and second connection arm portions 42d, 42e being arranged on both of the left and right sides of the inner body 42 to be spaced away from one another in the up-down direction. A circular flow hole 49 is formed in a center portion of the cross portion 42h.

A cleaner box 50 which forms part of the air cleaner 38 and whose downstream end is connected to the throttle body 39 is supported by the cross portion 42h to communicate with the flow hole 49. Moreover, a cleaner element 51 for filtering air which is introduced into the cleaner box 50 through the flow hole 49 is supported by the cross portion 42h, and an unpurified air chamber 52 which the cleaner element 51 faces is formed by the rear frame 13.

Moreover, in the outer body 41, an intake port 53 opened in at least one of the side wall portions 41a and the upper wall portion 41b, the upper wall portion 41b in the embodiment, is provided to communicate with the unpurified air chamber 52, and a rib 54 having an endless shape surrounding the intake port 53 and protruding inward or outward (outward in the embodiment) is integrally provided.

Air from outside is introduced into the unpurified air chamber 52 from a gap between the rider seat 11 and the upper wall portion 41b of the outer body 41 in the rear frame 13, through the intake port 53.

Furthermore, a recess portion 55, which forms a passage 56 communicating with the unpurified air chamber 52 between a center of a rear end portion of the lower wall portion 42a in the inner body 42 and a rear end portion of the upper wall portion 41b in the outer body 41, is formed in the center of the rear end portion of the lower wall portion 42a to be recessed downward, and air from the outside is introduced into the unpurified air chamber 52 also from the passage 56.

The exhaust mufflers 36 are supported by the rear frame 13 and muffler covers 57 covering the exhaust mufflers 36 from above and lateral outer sides are also supported by the rear frame 13.

To support the exhaust mufflers 36, flat plate-shaped outer muffler supporting portions 41e integrally continuous with rear lower portions of the side wall portions 41a of the outer body 41 are formed in the outer body 41, flat plate-shaped inner muffler supporting portions 42i integrally continuous with rear ends of the lower frame portions 42b of the inner body 42 are formed in the inner body 42 to be in contact with inner surfaces of front halves of the outer muffler supporting portions 41e, and muffler stays 58 fixedly attached to the exhaust mufflers 36 are jointly fastened to the outer muffler supporting portions 41e and the inner muffler supporting portions 42i. Specifically, third bolts 61 are inserted into insertion holes 59 which are formed in the outer muffler supporting portions 41e of the outer body 41 and into insertion holes 60 which have a larger diameter than the insertion holes 59 and which are formed in the inner muffler supporting portions 42i of the inner body 42, and the muffler stays 58 are fastened to the outer muffler supporting portions 41e and the inner muffler supporting portions 42i by using the third bolts 61.

The second outer fastening portions 41d in the front portion of the outer body 41 are formed to protrude downward beyond the second inner fastening portions 42g in the inner body 42. Insertion holes 62 are formed in portions of the second outer fastening portions 41d protruding beyond the second inner fastening portions 42g, and front portions of the muffler covers 57 are fastened to the portions of the second outer fastening portions 41d protruding beyond the second inner fastening portions 42g by using fourth bolts 63 inserted into the insertion holes 62.

Moreover, the outer muffler supporting portions 41e of the outer body 41 are formed such that portions of the outer muffler supporting portions 41e protrude rearward beyond the inner muffler supporting portions 42i of the inner body 42. Insertion holes 64 are formed in the portions of the outer muffler supporting portions 41e protruding beyond the inner muffler supporting portions 42i, and cover stays 65 fixedly attached to the muffler covers 57 are fastened to the portions of the outer muffler supporting portions 41e protruding beyond the inner muffler supporting portions 42i by using fifth bolts 66 inserted into the insertion holes 64.

Furthermore, flat plate-shaped first fender supporting portions 41f are formed integrally respectively in rear upper portions of the side wall portions 41a of the outer body 41. A pair of left and right second fender supporting portions 42j are formed integrally in a rear portion of the lower wall portion 42a of the inner body 42. Insertion holes 67 are formed in the first fender supporting portions 41f and insertion holes 68 are formed in the second fender supporting portions 42j.

An intermediate portion, in the front-rear direction, of a rear fender 69 covering the rear wheel WR from above is fastened to the first fender supporting portions 41f by using sixth bolts 70 inserted into the insertion holes 67 and a front end portion of the rear fender 69 is fastened to the second fender supporting portions 42j by using seventh bolts 71 inserted into the insertion holes 68.

Next, operations of the first embodiment are described. Since the rear frame 13 which is a frame body forming at least part of the vehicle body frame F is formed by joining the press-molded outer body 41 made of fiber reinforced resin and the injection-molded inner body 42 made of resin with the inner body 42 brought into contact with the inner surface of the outer body 41, freedom in partially setting thickness of the inner body 42 is increased. Hence, thickness of a portion whose strength is desired to be secured can be increased to increase strength of this portion and the outer body 41 can be reinforced by bringing the inner body 42 into contact with the outer body 41. Moreover, since thickness of the outer body 41 can be uniform, it is possible to greatly reduce the number of preform steps and reduce manufacturing cost.

Moreover, since the outer body 41 is made of carbon fiber and thermosetting resin which has better surface quality and better designability than thermoplastic resin, the outer body 41 can have excellent surface quality and excellent designability and particularly be formed in a complex shape by press-molding. Moreover, press preprocessing such as preheating and the like is unnecessary and cost of manufacturing facility can be reduced. Furthermore, since viscosity of the resin in a melted state is low, it is possible to employ low-pressure pressing and further reduce the cost of manufacturing facility.

In addition, since the carbon fiber, which is reinforcing fiber, used in the outer body 41 is formed as continuous fiber, strength and stiffness of the outer body 41 can be improved.

Moreover, the rear frame 13 is a frame which supports the rider seat 11 and which is fastened to the first and second fastened portions 20a, 20b of the front frame 12 and extends rearward from the front frame 12 to form the vehicle body frame F in cooperation with the front frame 12 supporting the power unit P, and the first and second outer fastening portions 41c, 41d formed integrally in the front end portion of the outer body 41 and the first and second inner fastening portions 42f, 42g formed integrally in the front end portion of the inner body 42 are jointly fastened to the first and second fastened portions 20a, 20b. Accordingly, stiffness of a connection portion of the rear frame 13 to the front frame 12 can be secured with the first and second outer fastening portions 41c, 41d reinforced by the first and second inner fastening portions 42f, 42g.

Furthermore, since the first and second inner fastening portions 42f, 42g are formed to be thicker than the portion of the inner body 42 other than the first and second inner fastening portions 42f, 42g, it is possible to increase strength of a portion requiring higher strength while avoiding an increase in the weight of the entire rear frame 13.

In addition, since each of the flat plate-shaped side wall portions 41a connecting the pair of the upper first outer fastening portion 41c and the lower second outer fastening portion 41d which are arranged to be spaced away from each other in the up-down direction is formed integrally in the outer body 41, the strength of the connection portion of the press-molded outer body 41 to the front frame 12 can be increased in a simple configuration.

Moreover, the outer body 41 integrally includes the pair of the left and right side wall portions 41a and the upper wall portion 41b connecting the upper ends of the side wall portions 41a and is thus formed to have the U-shaped cross section opened downward. Meanwhile, the inner body 42 integrally includes the lower wall portion 42*a* facing the upper wall portion 41*b* from below and is formed in contact with the inner surfaces of the pair of left and right side wall portions 41*a* to form the box-shaped rear frame 13 together with the outer body 41. Accordingly, a portion of the rear frame 13 exposed on a lateral side of the vehicle is smooth and ride quality of a rider sitting on the rider seat 11 can be improved. Moreover, load of the rider seat 11 and the rider sitting on the rider seat 11 is received by the upper wall portion 41*b* of the outer body 41 and good distribution of the load can be thus achieved.

Furthermore, in the outer body 41, the intake port 53 opened in the upper wall portion 41*b* is provided, the rib 54 having the endless shape surrounding the intake port 53 and protruding outward is integrally provided, and the unpurified air chamber 52 of the air cleaner 38 is formed by the rear frame 13 to communicate with the intake port 53. Accordingly, outside air can be taken into the unpurified air chamber 52 of the air cleaner 38 from the intake port 53 communicating with the unpurified air chamber 52 with a peripheral edge of the intake port 53 reinforced by the rib 54. In addition, the rib 54 in the peripheral edge of the intake port 53 can achieve a structure which straightens intake air and hinders discharging of the intake air. Hence, intake efficiency can be improved.

In addition, the first and second connection arm portions 42*d*, 42*e* having the first and second inner fastening portions 42*f*, 42*g* at the tip end portions thereof are formed integrally in the front portion of the inner body 42 on both of left and right sides of the inner body 42 while being spaced away from one another in the up-down direction, the cross portion 42*h* connecting the base portions of the first and second connection arm portions 42*d*, 42*e* to one another are formed integrally, and the cleaner element 51 of the air cleaner 38 is supported by the cross portion 42*h*. Accordingly, it is possible to secure the strength of the rear frame 13 and also reduce the weight of the rear frame 13 because there is no need to attach a special member for supporting the cleaner element 51 to the rear frame 13.

A second embodiment of the present invention is described with reference to FIG. 5. Parts corresponding to those in the first embodiment are illustrated with the same reference numerals and detailed description thereof is omitted.

Figure 5:
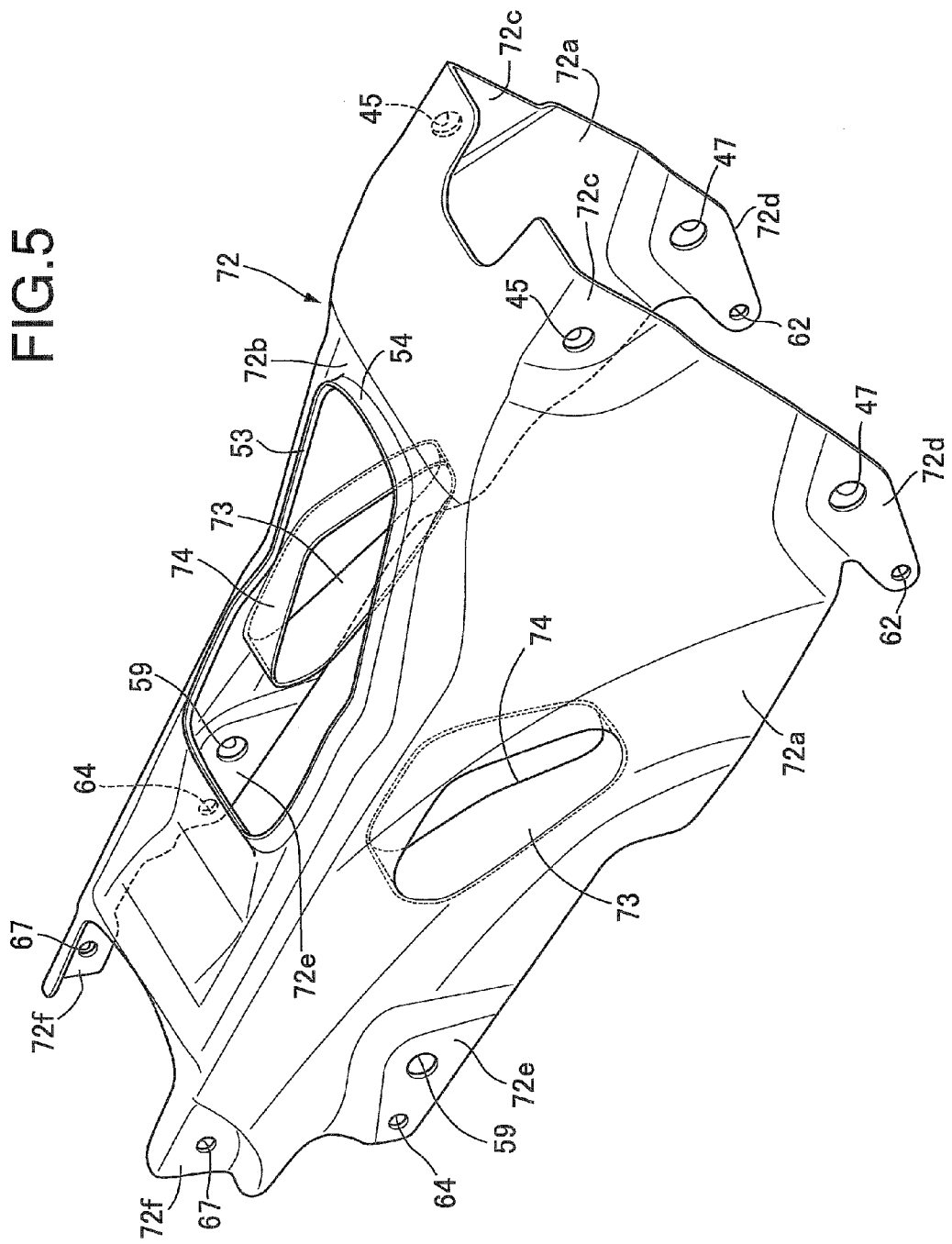
FIG. 5 is a perspective view of an outer body of a second embodiment.

Instead of the outer body 41 in the first embodiment, an outer body 72 shown in FIG. 5 may be used. Like the outer body 41 in the first embodiment, the outer body 72 integrally includes a pair of left and right flat plate-shaped side wall portions 72*a* and an upper wall portion 72*b* connecting upper ends of the side wall portions 72*a* to each other and is thus formed to have a U-shaped cross section opened downward.

Moreover, a first outer fastening portion 72*c* having an insertion hole 45 is formed in an upper portion of a front portion of each of the side wall portions 72*a*, a second outer fastening portion 72*d* having insertion holes 47, 62 is formed in a lower portion of the front portion of each side wall portion 72*a*, an outer muffler supporting portion 72*e* having insertion holes 59, 64 is formed in a rear lower portion of each side wall portion 72*a*, and a first fender supporting portion 72*f* having an insertion hole 67 is formed in a rear upper portion of each side wall portion 72*a*.

In the outer body 72 described above, intake ports 53, 73 are provided in at least one of the side wall portions 72*a* and the upper wall portion 72*b*, in the second embodiment, in all of the wall portions. Specifically, the intake port 53 is provided in the upper wall portion 72*b* of the outer body 72, the intake ports 73 are provided in the side wall portions 72*a*, and ribs 74 having endless shapes surrounding the intake ports 73 and protruding inward or outward (inward in the embodiment) are provided integrally in the outer body 72.

Effects similar to those in the first embodiment can be obtained also in the second embodiment.

Although the embodiments of the present invention are described above, the present invention is not limited to the aforementioned embodiments. Various design changes can be made without departing from the present invention described in the scope of the claims.

What is claimed is:

1. A vehicle body frame structure of a saddle-ride vehicle comprising:
   a frame body having at least a part made of fiber reinforced resin and forming at least part of a vehicle body frame supporting a rider seat and a power unit which generates a drive force for driving a drive wheel,
   wherein the frame body is formed by joining together a press-molded outer body made of fiber reinforced resin and an injection-molded inner body made of resin with the inner body brought into contact with an inner surface of the outer body,
   the frame body is a rear frame which supports the rider seat and which is fastened to a fastened portion of a front frame supporting the power unit and extends rearwardly from the front frame to form the vehicle body frame in cooperation with the front frame,
   an outer fastening portion formed integrally in a front end portion of the outer body and an inner fastening portion formed integrally in a front end portion of the inner body are jointly fastened to the fastened portion,
   the outer body integrally includes a pair of left and right side wall portions and an upper wall portion connecting upper ends of the side wall portions to each other and is thus formed to have a U-shaped cross section opened downward,
   the inner body integrally includes a lower wall portion facing the upper wall portion from below and is formed in contact with inner surfaces of the pair of left and right side wall portions to form the rear frame in a box shape together with the outer body,
   an intake port opened in at least one of the side wall portions and the upper wall portion is provided in the outer body,
   a rib having an endless shape surrounding the intake port and protruding inwardly or outwardly is provided integrally in the outer body, and
   an unpurified air chamber of an air cleaner is formed by the rear frame to communicate with the intake port.

2. The vehicle body frame structure of a saddle-ride vehicle according to claim 1, wherein the inner fastening portion is formed to be thicker than a portion of the inner body other than the inner fastening portion.

3. The vehicle body frame structure of a saddle-ride vehicle according to claim 1, wherein a flat plate-shaped side wall portion connecting a pair of upper and lower outer fastening portions, as said outer fastening portion, is formed integrally in the outer body, the pair of the outer fastening portions arranged to be spaced away from each other in an up-down direction.

4. The vehicle body frame structure of a saddle-ride vehicle according to claim 1, wherein
   in a front portion of the inner body, connection arm portions each having the inner fastening portion in a tip end portion thereof are integrally formed to be spaced away from each other in an up-down direction in each of left and right sides of the inner body, and a cross portion connecting base portions of the connection arm portions together is integrally formed, and a cleaner element of the air cleaner is supported by the cross portion.

5. The vehicle body frame structure of a saddle-ride vehicle according to claim 1, wherein the outer body is made of carbon fiber and thermosetting resin.

6. The vehicle body frame structure of a saddle-ride vehicle according to claim 1, wherein reinforcing fiber used in the outer body is formed as continuous fiber.

7. The vehicle body frame structure of a saddle-ride vehicle according to claim 2, wherein the outer body is made of carbon fiber and thermosetting resin.

8. The vehicle body frame structure of a saddle-ride vehicle according to claim 2, wherein reinforcing fiber used in the outer body is formed as continuous fiber.

\* \* \* \* \*